Oct. 18, 1927.
O. E. ENELL
FINISH REMOVER CONTAINING WAX
Filed Dec. 24, 1924
1,646,281
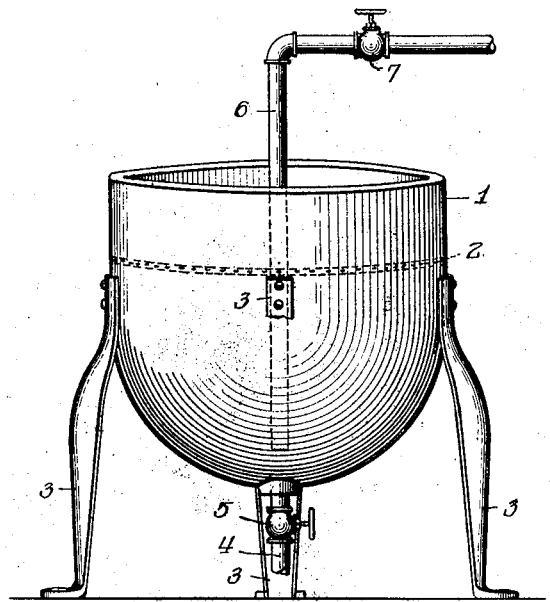
Witness:
R. Burkhardt
Inventor:
Otto E. Enell, Patented Oct. 18, 1927.

1,646,281

UNITED STATES PATENT OFFICE.

OTTO E. ENELL, OF ALHAMBRA, CALIFORNIA, ASSIGNOR TO CHADELOID CHEMICAL COMPANY, OF NEW YORK, N. Y., A CORPORATION OF WEST VIRGINIA.

FINISH REMOVER CONTAINING WAX.

Application filed December 24, 1924. Serial No. 757,816.

The present invention relates to compositions for removing paint, varnish and other forms of surface finish.

Removers such as are useful for removing paint, varnish, or other surface finishes, have as an important ingredient a certain solvent, or solvents, which are highly volatile. If said volatile solvents are used without some protective means they will volatilize before they have accomplished their solvent functions.

Means have been provided and are being used to prevent the too rapid evaporation of the solvents. The present invention relates to means and methods for preventing this too rapid evaporation and has for one of its objects the provision of a remover containing a body-giving substance which will remain in suspension in the remover to protect same against evaporation.

A further object is to provide a remover useful for the removal of paint, varnish, or other surface finish, which remover is effective on a surface at whatsoever angle said surface may be presented.

A further object is to provide a process for preparing a remover which will resist evaporation and which will retain a homogeneous nature for prolonged periods of time.

A further object is to provide an improved remover suitable for surface finish removal which substance may be applied over a surface from which it is desired to remove the old paint, etc., and which will effectively resist evaporation, whereby the work of removal may be greatly expidited.

A further object is to provide an improved remover suitable for use as a remover of paint, varnish and other surface finishes which has improved solvent qualities over substances as heretofore known and used.

A further object is to provide a remover and process for making same which will remain wet or soft longer than has been the case with removers heretofore known and used.

A further object is to provide a method of making a mixture of a wax-like substance and a liquid acting as a solvent or softener for the coating, which though kept, even without stirring, remain in homogeneous condition for a long time.

Further objects will appear as the description proceeds.

The accompanying sheet of drawing illustrates diagrammatically certain apparatus which may be used in carrying out the present invention.

It is an important feature of the present invention that liquid solvents be mixed with a body-giving substance which will remain in suspension in the solvents for an indefinite period of time whereby to retain the homogeneous nature of the mixture. This characteristic is important in the functions of the solvent substance to the end not only that the homogeneous nature may be retained during storage and shipment, but also to the end that when said mixture is spread upon a surface to be treated the liquid solvents will be protected against evaporation and that the coating of remover will remain soft and effective until it has performed its solvent functions, i. e. until the paint, etc., is sufficiently dissolved or loosened. In order to accomplish the results aimed at, the present invention contemplates the mixture with solvents as heretofore known and used, such as benzol and acetone, a specially treated wax-like substance, or a product resulting from the treatment of wax, which product has such a density that it will remain for a very long time in suspension in said solvents.

The method of producing said body-giving substance (which will be referred to hereinafter as the refined product) will first be briefly described.

A non-mineral wax, or waxes such, for example, as carnauba wax, is treated with trisodium phosphate and water. The mixture of wax trisodium phosphate and water is boiled in a kettle or other receptacle. By this boiling process a substance is obtained which has smooth, creamy or soap-like characteristics, the density being variable by varying the proportions of the ingredients and the time and temperature of the treatment. The boiling process above referred to will have the advantage, also, of throwing out from the wax many of the common impurities which may occur therein, such as tar, oils and other foreign substances in most cases. Said impurities or foreign substances have greater density than the smooth, creamy or soap-like substance above referred to, and will settle at the bottom of the kettle or other receptacle. The precipitate of impurities may be drawn off from the bottom of said kettle or receptacle, and the product may be washed with water to insure the complete removal of impurities. Said washing with water will remove most of the free trisodium phosphate. By continued washings the amount of free trisodium phosphate may be reduced to a very small amount. In many instances, however, the presence of trisodium phosphate is decidedly beneficial. If the presence of trisodium phosphate in a free state is desired, the amount of washing may be cut down, or trisodium phosphate may be added after the product has been completely washed.

Without restricting the invention to details, the following is given as a preferred treatment of carnauba wax of the common ordinary variety, of what might be considered to be about an average grade of purity. 10 pounds of the carnauba wax are melted and say 5 gallons of water containing 2 pounds of trisodium phosphate are added, (hot or cold). The mass is brought to about the boiling point of water and stirred well for say 10 minutes. The steam is then cut off and the mass allowed to settle, the melted wax floating on the aqueous material in which the impurities have largely settled to the bottom. The water and sludge are then drawn off from the bottom, leaving the relatively pure wax in the receptacle. The wax can then be washed, with water, as stated below. The boiling and agitation with trisodium phosphate can be continued for a longer time, or can be repeated several times if a more thorough purification is desired, but for ordinary uses of the wax, one treatment will be enough.

A diagrammatic showing of apparatus appears in the drawing. It will be understood that said apparatus is merely indicative of the principles of apparatus which may be used in carrying out the present invention. Referring to said drawing, the numeral 1 indicates a kettle, which may be provided with a steam jacket, indicated by the numeral 2, for the purpose of heating said kettle. Said kettle may be carried by the standards 3—3 and may have an outlet 4 at its bottom, which outlet is controlled by the valve 5. Extending into said kettle is the pipe 6, which may be controlled by the valve 7. As clearly indicated in the drawing, the pipe 6 extends to a region adjacent to the bottom of the kettle. The smooth, creamy or soap-like product which is to be recovered floats upon the hot water beneath same, which hot water contains the impurities which have been thrown out of the wax or the trisodium phosphate used. Water will be admitted through the pipe 6 and the outlet valve 5 will be opened. This action will flush out the bottom of the kettle and will chill the supernatant product which is desired to be produced. This chilling will result in the formation of a semi-solid substance, the density of which depends upon the proportions of the ingredients, the length of time of treatment, and the temperature of the treatment, as above referred to.

After the water containing the impurities above referred to has been drawn off, the valve 5 may be closed and fresh water admitted through the pipe 6. The fresh supply of water may be heated to the degree necessary to dissolve the creamy, soap-like substance above referred to. Agitation may be applied to the contents of the kettle, whereby further impurities will be washed out of said substance. The liquid at the bottom of the kettle may be again chilled by the application of cold water, which application will chill the supernatant substance, which will again attain a semi-solid consistency. The water may then be drawn off from the bottom of the kettle. Further washings may be given, if preferred, to produce a substance of the desired purity.

The resulting product may be mixed with a solvent liquid, for example—benzol, acetone, or any other liquid solvent or may be mixed with other wax, as, for example, ozokerite, or with a refined ozokerite wax such as ceresin. Many other combinations involving the refined product above referred to will at once occur to those skilled in the art. The consistency of the resultant solvent substance will vary with variations in the refined product above referred to and the substances mixed therewith. The proper consistency for maintaining the advantage that the body-giving substance will remain in suspension in the liquid solvents may be readily determined by trial. An example taken from practice, which, however, is not to be taken in a limiting sense, is as follows: 1 ounce of the refined product above referred to, ½ gallon of benzol, and ½ gallon of acetone. The mixture may be accomplished by melting the refined product referred to and adding to the liquid solvents in a warm liquid state, or said refined product may be added in solid or semi-solid state to the liquid solvents, and the temperature increased while the mixture is agitated to produce the required admixture.

It is to be understood that the above description is not to be considered in a limiting sense. Many modifications will occur to those skilled in the art. It is intended to cover all such modifications that fall within the scope of the appended claims.

The method of treating non-mineral wax and also the treated wax, as described herein, are claimed in my concurrent application 757,815.

What is claimed is:

1. A finish remover comprising volatile solvents adapted to act upon dried coats of paint, varnish and the like, and a herein described treated wax, such wax comprising the constituents of normal wax free from those normal constituents of impure wax which are capable of being removed by treatment with hot trisodium phosphate solution, such wax product being of a somewhat lower specific gravity than of wax of like kind and ordinary grade of purity, and being less liable to granulate and separate out from varnish remover on standing, and being of a softer consistency than ordinary wax of like kind and of ordinary grade of purity.

2. A finish remover comprising relatively volatile solvents adapted to act upon dried coats of paint, varnish and the like, and a herein described carnauba wax, such wax comprising the constituents of ordinary carnauba wax and free from those normal constituents thereof which are capable of being removed by treatment with hot trisodium phosphate solution, such wax product being of a somewhat lower specific gravity than ordinary carnauba wax, and being less liable to granulate and separate out from the varnish remover on standing, and being of a softer consistency than ordinary grades of carnauba wax.

Signed at Chicago, Illinois, this 24th day of November, 1924.

OTTO E. ENELL.